United States Patent [19]

Streit

[11] 4,288,108

[45] Sep. 8, 1981

[54] COLLAR COUPLED PLASTIC CONDUIT

[75] Inventor: Kenneth F. Streit, Mt. Prospect, Ill.

[73] Assignee: Techplastics, Inc., West Chicago, Ill.

[21] Appl. No.: 61,356

[22] Filed: Jul. 27, 1979

[51] Int. Cl.³ .............................................. F16L 39/00
[52] U.S. Cl. ................................ 285/137 R; 285/347; 285/369; 285/423; 285/DIG. 22
[58] Field of Search .............. 285/DIG. 22, 369, 347, 285/137 R, 423, DIG. 4, 260; 138/115, 117, 155

[56] References Cited

U.S. PATENT DOCUMENTS

| | | | |
|---|---|---|---|
| 2,452,219 | 10/1948 | Bergrall et al. | 285/DIG. 2 |
| 3,501,179 | 3/1970 | Boynton et al. | 285/DIG. 4 |
| 3,785,682 | 1/1974 | Schaller | 285/423 |
| 3,792,878 | 2/1974 | Freeman | 285/137 R |
| 3,872,894 | 3/1975 | Streit | 285/137 R |
| 3,895,830 | 7/1975 | Madlem | 285/137 R |
| 3,899,198 | 8/1975 | Maroschak | 285/260 |
| 4,050,721 | 9/1977 | Streit | 285/423 |
| 4,096,887 | 6/1978 | Streit | 138/117 |
| 4,176,865 | 12/1979 | Felton | 285/DIG. 4 |

Primary Examiner—Dave W. Arola

Attorney, Agent, or Firm—Dressler, Goldsmith, Shore, Sutker & Milnamow, Ltd.

[57] ABSTRACT

A plastic conduit for protecting and directing electrical and telephone cables, employing elongated barrel portions with lipped ends and a snap-on coupling collar. Partition walls intergral with the conduit walls are used to divide the internal passageway of the conduit section. The partition walls are contoured at each end to interlock with the ends of adjacent conduit sections to provide column-like support. Gasketed ends seal the joint between the conduit section and coupling collar. Flanged ends index the coupling collar and limit axial movement and deflection. Interrupted peripheral lips and an interrupted annulus within the coupling collar provide for differential flaring out of the collar ends and corresponding necking-in of the conduit ends as the two are telescoped together. The lipped edges are received within the annulus of the coupling collar and snap fit into position. The snap fitting lips lock the conduit section to the coupling collar. The coupling collar is reinforced within external ribs and has camming surfaces at each end to assist snap fitting the coupling collar onto the conduit ends.

17 Claims, 5 Drawing Figures

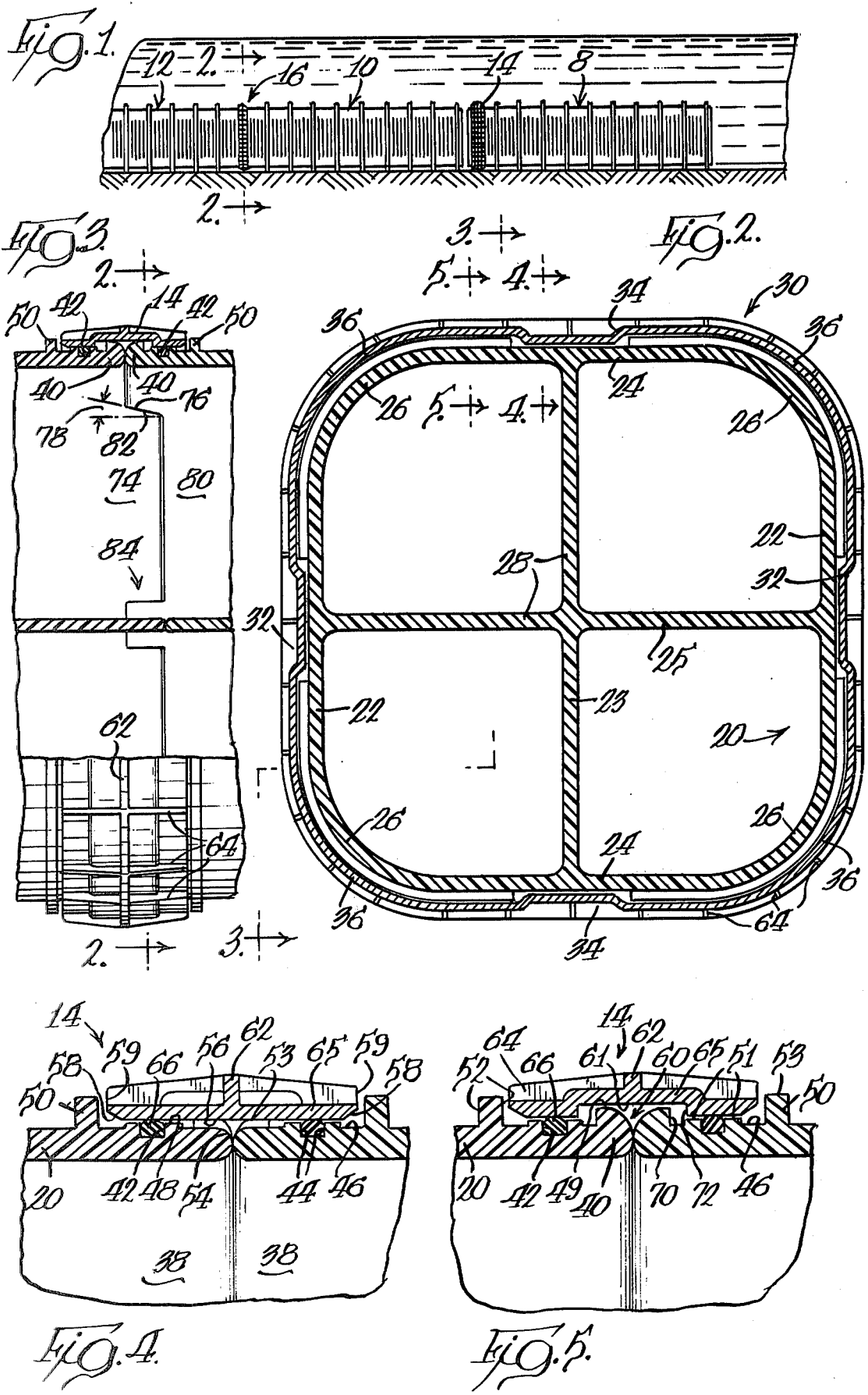

COLLAR COUPLED PLASTIC CONDUIT

DESCRIPTION

1. Technical Field

This invention relates to plastic conduit and, in particular, to the means by which adjacent conduit sections are coupled together.

Plastic conduits are most conveniently joined together by employing mechanical components rather than adhesives or fixitives. Mechanical joints may be broken or disassembled without destroying or permanently affecting conduit structural integrity. More importantly, mechanical joints allow for a certain amount of flexing and growth due to environmental conditions. Inspection, trouble-shooting, repair and reuse of conduit components are additional benefits of using mechanical methods of joining or coupling adjacent conduit sections.

Finally, corrosion and deterioration of conduit system integrity are minimized by employing plastic or inert materials in favor of metal components to join adjacent conduit sections. Spring clips can slip off and present some difficulty in installation in the close confines of a trench.

2. Background Art

U.S. Pat. No. 3,792,878 discloses a plastic conduit system wherein adjacent conduit sections are held together by spring clips. Such clips are made of metal. Since such conduit sections are buried underground, these clips often undergo corrosion and deterioration. Eventually they may disintegrate and lose their holding power. Consequently, water and silt can gradually flow into the conduit. In addition, since mechanical and watertight integrity will be degraded, settling of the surrounding soil may break the two sections apart resulting in accelerated seepage of water and mud into the entire conduit system. Long-term watertight integrity is important for conduit systems used to carry telephone and communications cable underground. The invention described herein offers an improved coupling system for such conduit networks, features all plastic construction, and increased reliability.

Push-on pipe joints of the conventional bell and spigot variety do not resist bending moments of axial forces tending to separate the joints, but yield to them to an extent limited by the designer's allowable angular deflection and end movement specifications. Although end movements can be limited by harnessing, by binding with a combination of rods and clamps, or by anchoring to relatively stable structures, such methods are costly and difficult to employ in buried conduit or pipe.

A grooved pipe joint features a groove cut on the exterior of the pipe or conduit. Cut grooves, because of the reduction in pipe wall thickness, are limited to thick walled pipe. Control of outside diameter becomes important. Permissible minus tolerance is limited since it impairs the grip of pipe couplings. Plus tolerance makes it necessary to cut grooves deeper, increasing the thinning of the pipe wall. Unlike push-on joints, grooved joints resist axial loads tending to separate the joints. Angular deflection up to the limit specified by the designer, may be used to absorb thermal expansion and to lay the pipe on uneven ground. However, by comparison, the bell and spigot joint possesses greater flexibility and provides for expansion and contraction.

Compared with flanged joints, grooved pipe joints will not pull misaligned pipe into alignment. Thus, grooved pipe joints require more support, but otherwise they require less labor and handling during assembly and disassembly. However, flanged pipe joints have superior strength and tightness at the joint.

As will readily be apparent from the description following, the coupling system encompassed by the invention herein disclosed adopts the advantages of the push-on pipe joint, the grooved pipe joint, and the flanged pipe joint. Limited flexing (so as to be able to follow the contours of a burial trench) is achieved by forming a stop on the outside surface of the conduit ends that interacts with a push-on coupling collar. The problem of wall thickness tolerance control associated with the grooved joints is resolved by employing a coupling collar that provides the necessary groove in the form of an interior annulus and by employing lipped ends on the conduit section to fit within the annulus. Finally, the lipped end achieves the same effect of a flanged joint in providing superior strength and tightness at the sealing surface.

SUMMARY

In summary, plastic conduit sections of the present invention are held together by a coupling collar interposed between the ends of two adjacent conduit sections. Close tolerance in the inner transverse dimension of the collar and the outer transverse dimension of the grooves supporting a sealing gasket form a seal between the collar and the conduit. A flat relatively wide surface to either side of the groove aligns the axis of the collar to the axis of the conduit section when joining one to the other. A flange adjacent to the groove on the conduit sections keeps the collar at the proper distance from the end of the conduit and ensures that a sufficient amount of exposed collar remains to attach the second conduit section on the collar. The collar is locked on the conduits by a snap-fitting, mechanical, interference fit.

The collar and conduit, may be made of different density similar plastic materials and, in such a case, are of different resilience. Therefore, one may be deflected relative to the other as they are joined together. Each conduit end is provided with a lip that has a greater outer transverse dimension than the inside dimension of a central interior annulus of the collar, and hence a snap-fit is achieved once the lip passes beyond the collar edge and enters into the central interior annulus. A camming surface on the inside edge of the collar ends cooperates with a rounded leading edge of the lip on the conduit ends in joining the collar to the conduit. Finally, the lip on the conduit ends and the annulus on the coupling collar are interrupted and discontinuous. This not only allows the lip to neck inwardly and the collar to flare outwardly while the two are telescoped together, but also allows for imperfections in the collar annulus to conduit lip eccentricity tolerances and mitigates against the buildup of internal, structural stresses at the collar annulus and conduit lip interface. This system of a lip on the conduit end portions and a complementary annulus in the collar forms a snap locking means mechanically holding the conduits to the collar.

BRIEF DESCRIPTION OF THE SEVERAL VIEWS OF THE DRAWINGS

In the accompanying drawings forming part of the specification, and in which like numerals are employed to designate like parts throughout the same:

FIG. 1 is an elevational view illustrating several conduit sections of the present invention installed in a trench;

FIG. 2 is an enlarged cross-sectional view taken generally along plane 2—2 of FIG. 1;

FIG. 3 is a partial longitudinal sectional view taken generally along plane 3—3 of FIG. 2;

FIG. 4 is an enlarged fragmentary sectional view taken generally along plane 4—4 of FIG. 2; and FIG. 5 is an enlarged fragmentary sectional view taken generally along the plane 5—5 of FIG. 2.

DETAILED DESCRIPTION

While this invention is susceptible of embodiment in many different forms, there has been shown in the drawing and herein will be described in detail a preferred embodiment of the invention, with the understanding that the present disclosure is to be considered as an exemplification of the principles of the invention and is not intended to limit the invention to the embodiment illustrated.

Referring to FIG. 1, a plurality of conduit sections 8, 10 and 12 are illustrated in the typical manner in which they are installed in a trench which has been excavated to a desired depth. Each of the conduit sections illustrated in FIG. 1 is substantially identical in construction and configuration. Each is preferably made from a high impact plastic, such as linear polyethylene which may readily be injection molded. A coupling collar 14 is most conveniently attached to one end of a conduit section prior to loading in the trench. An adjacent conduit section is then joined by inserting it within the collar held on the previous conduit section so as to form a unitary structure 16.

The configuration of the conduit section and coupling collar is generally illustrated in FIGS. 2 and 3. Each conduit section consists of an elongated smooth surfaced enclosure defined by walls 20 which for purposes of illustration may include a first pair of flat walls 22 and a second pair of generally flat parallel walls 24 perpendicular to walls 22 with the ends of adjacent pairs of walls interconnected by radial portions 26.

The enclosure defined by walls 20 is divided into a plurality of passageways (i.e., four are shown in FIG. 2) by transverse partition walls 28 which: are injection molded, are integral with conduit enclosing walls 20, and form a grid-like internal wall structure when viewed from the end of conduit section.

Walls 22, 24 and 26 are a given thickness and may be reinforced to substantially increase the resistance of the walls to withstand pressure and loads to which the conduits may be subject to while buried underground. A preferred method of enforcement is disclosed in U.S. Pat. No. 4,096,887 the portions of which are consistent herewith being incorporated herein by this reference.

FIG. 2 also illustrates the construction of the coupling collar 14. Each collar consists of an elongated smooth surfaced enclosure defined by walls 30 which for purposes of illustration may include a first pair of flat walls 32 and a second pair of generally flat walls 34 with adjacent ends of adjacent pairs of walls being interconnected by radial portions 36.

In the construction of the coupling collar and the conduit sections, one or both pairs of parallel walls may be: eliminated or modified so as to form a generally circular or eliptical enclosure; or extended differentially so as to form a generally rectangular enclosure. Likewise, the partition walls may be arranged to more or less than the illustrated four passageways and the individual passageways need not be of the same size and shape.

FIG. 3 illustrates two conduit sections joined together by a coupling collar 14. Adjacent conduit sections are interconnected by aligning the ends forcing them together relative to the enclosing collar. The coupling collar may be installed on one conduit section in the field or at the factory. Most conveniently for purposes of installation and packaging, it is envisioned that the coupling collar will be installed on one end of the conduit section prior to shipment of the sections from the factory.

As can best be seen in FIGS. 4 and 5, the end portions of the conduit sections are identical in exterior configuration. Each end portion 38 features a lip 40, a groove 42, and a flange 50.

The lip is outwardly extending and interrupted. The edges of the lip are preferably bevelled or rounded to a smooth surface to facilitate indexing the collar to the conduit. As will be explained later, the bevelled edge also assists spreading apart the collar's edges and necking-in in the edges of the conduit relative to the collar so as to achieve a snap action fit.

Adjacent to the lip 40 is a peripheral, rectangular, walled groove 42 with side walls 44 extending beyond the outer surface 46 of the conduit section. The outer transverse dimension 48 of the side walls 44 is generally less than the outer transverse dimension 49 of lip 40. The copings 51 of the side walls are parallel to the outer surface 46 of the conduit section. The copings are sufficiently wide so as to provide a mating and alignment surface for the inside surface 53 of the collar 14. While the groove is shown rectangular and walled, the groove need not be so constructed. The essential function of the groove (holding a sealing gasket) and the copings (aligning the conduit to the collar) can be achieved by a variety of similar surface geometries. This will be discussed in greater detail at a later point.

Further inward and adjacent to the walled groove 42 is a peripheral, circumferential, flat faced flange 50 with faces 52 generally perpendicular to the conduit enclosing walls 20. The outer transverse dimension 53 of the flange 50 is generally greater than the outer transverse dimension 49 of the lip 40.

The lip 40 is interrupted on either side of the principal axes or center lines 23 and 25 of the conduit enclosing walls 20. (See FIG. 2.) That portion of the enclosing walls 20 where the lip is interrupted is bevelled or rounded to a smooth edge 54. The purpose of the interrupted lip is to facilitate joining the conduit section to the collar. If the lip were not interrupted, the concentricity tolerances of the conduit section lip 40 and the collar 14 would have to be subject to more stringent manufacturing controls so as to insure a uniform snap fit without unnecessarily binding the members. This would unnecessarily raise the expense of fabrication and lead to greater rejects particularly if an injection molding process were used to form the conduits and collars. The lip also acts to strengthen the corners of the conduit section in that it acts as a reinforcing rib. In addition, the interrupted lip allows the conduit section to flex and move out of perfect alignment without unduly stressing the collar or end portions of the conduit structure. Most importantly, it should be noted that if the lip were continuous, the conduit ends would be more rigid which would oppose the necking-in action of the lip as the collar and conduit end are telescoped together. For a purpose of illustration, FIG. 2 shows lip 40 interrupted along a sector of about 20 degrees to either side of the principal axes 23 and 25 of the conduit section. The overall perimeter and rigidity characteristics of the materials would have to be considered in determining the length, the number and the locations of interruptions for a given conduit cross sectional shape.

The inner transverse dimension 56 of the enclosing collar 14 is generally equal to that of the outer transverse dimension 48 of the copings 51 of the walls 44 of groove 42. The inner surface of the enclosing collar is generally flat and smooth. The inner end portions of the enclosing collar have bevelled or chamferred edges 58 to facilitate indexing the collar to a conduit section and achieving the differential inward necking of the lip relative to the outward flaring of the collar as the two are joined together. Those portions on the inside of the collar corresponding to the locations of the raised lip 40 on the conduit section are recessed so as to form an interrupted annulus 60. The outer transverse dimension 61 of the annulus 60 being slightly greater than the outer transverse dimension 49 of the lip 40 on the conduit section. Once the lip 40 passes into the annulus 60, the heretofore necked-in lip 40 rapidly resumes its original shape, thus achieving what is commonly called a snap fit. Close dimensional control achieves a mechanical interference fit. Thus, the conduit section and the collar lock together.

To provide strength without excessive use of material the enclosing collar 14 is reinforced with a series of ribs. An outwardly extending, reinforcing rib 62 extends completely around the perimeter of the enclosing collar centrally thereof. (See FIG. 3.) Perpendicular to rib 62, and spaced longitudinally along it, are a series of transverse, outwardly extending, reinforcing ribs 64. The cross-section of the enclosing collar 65 is uniform and generally the same thickness with the exception of the bevelled end portion 58. The thickness of the collar is relatively thin compared to the thickness of the conduit. A thick collar would resist the differential flaring of the collar relative to the lip as the two are joined together. Thickness is not needed for sealing. Thus, the disadvantages of ordinary grooved joints previously discussed are eliminated.

Within groove 42 is fitted a gasket 66 of resilient material such that upon inserting a conduit section into the enclosing collar, the gasket 66 is sufficiently compressed so as to form a seal between the corresponding surfaces of the enclosing collar 56 and copings 51 of the conduit section. Gasket 66 is gradually or progressively compressed as the collar is applied by virtue of the camming action attributed to bevelled surface 58.

Sealing gaskets must of necessity have a radial thickness (or at least an axial part thereof) greater than the distance between the two surfaces meeting at the gasket. This radial thickness is required in order for that portion of the gasket to be under radial compressive force between the two surfaces, thus effecting a complete seal. For the same reason, it will be readily apparent that this part of the gasket must be constructed of readily deformable and resilient material. It is equally as important that the other axial portion of the gasket be constructed of more difficultly deformable material or be located within an enclosure resisting such deformation. For this reason, a gasket of the O-Ring variety fitted in a continuous groove, is provided to seal the joint between the coupling collar and the conduit section. The difference in dimensions of the collar 56 and the copings 51 determines the degree of compressibility of the gasket 66 for a given groove depth. The main purpose of the groove is to support the gasket mechanically and resist its deformation or displacement as the conduit section is telescoped on the coupling collar.

The width of the coupling collar 14 is less than the distance between two of the flanges 50 of two adjacent conduit sections. The flanges 50 serve to prevent the coupling collar 14 from moving further inward on the conduit section than is necessary to form the seal between the collar and the conduit section. It also prevents the collar from being pushed so far inward as to prevent an adjacent conduit section from being inserted within the annular groove 60. In addition, when two adjacent conduit sections are joined by the coupling collar, flanges 50 cooperating with collar edges 59 serve to increase the rigidity of the unified structure 16 formed by two adjacent conduit sections and a coupling collar. Thus, the aligning benefit of flanged joints previously discussed is achieved by the flange cooperating with the coupling collar.

Surfaces 70 and 72 butt together to prevent the collar from slipping past the conduit section, thus preventing the two joined conduits from slipping apart. These two surfaces come into engagement once the lipped end of the conduit section enters into the collar annulus and snaps back into original shape. In addition, the groove may be of the entrenched variety wherein the outer transverse dimension 48 of said groove 60 is greater than the outer transverse dimension of said conduit walls 20. Depending on the clearance between the inner transverse dimension 56 of the collar and the copings 51 of the groove, the copings may come into engagement with the collar interior before the collar ends 59 butt against the flange 50. This would then increase the rigidity of the collar and conduit joint.

Referring to FIG. 3, to provide column-like support to the joint between two adjacent coupled conduit sections, partition walls 28 project outwardly from one end of the enclosing wall 20 and into the opposite end of the adjacent conduit section to provide incline projections 74 having a U-complement shape. Projection 74 defines an inclined surface 76 at the top end of the U-complement shape which functions as a bearing surface. The angle of incline 78 is measured from surface 76 to a longitudinal plane normal to the partition wall. As indicated in FIG. 3, the angle of incline 78 should be in the range of about 10° to 20° (preferably 15°). The partition walls at the opposite end have a corresponding recess 80 to provide incline bearing surfaces 82 when inserted into an adjacent similar conduit section. In one embodiment is has been found that a clearance tolerance of 0.010 inches. (0.0254 cm) between surfaces 76 and 82 facilitate telescopic engagement of adjacent similar conduit sections.

Partition walls 28 may also be similarly provided with inclined projections 74 and recesses 80 at each end of the conduits at the points of intersection of the partition walls 84. Additional details concerning this method of construction are disclosed in U.S. Pat. No. 3,872,894, the portions of which are not inconsistent herewith being incorporated herein by this reference.

Numerous other advantages and features of the present invention will become readily apparent from the following detailed description of the invention and of the embodiments described, from the claims and from the accompanying drawings in which each and every detail shown is fully and completely disclosed as part of the specification.

While the preferred embodiment is illustrated as being an essentially round tube over its entire length, it is possible to incorporate the features of this invention in a length of pipe in which the cross section has a non-circular interior or a non-circular exterior or both. Furthermore, the precise shape of the exterior integral reinforcing flanges and ribs can be varied. It is also possible to vary the spacing of other parts.

The length of pipe of this invention can be fabricated in a length other than those having single straight line longitudinal access. For example, a length of pipe fitting such as an "L", a "Y", a reducer, a "T", a lateral, and the like. Likewise, a pipe as disclosed herein can be connected to a fitting or the like by cutting the pipe length and connecting the cut pipe length through the fitting in the manner described. Likewise, cylindrical conduits are included, since a circle is the special case of a polygon with an infinite number of straight line segments and a cylinder may be defined by circular ends.

Suitable materials may consist of polyethylene or polypropylene. Preferred materials are: structural foam made of polyolefin plastic, for the conduit section; neoprene, for the gasket; and a full density polyolefin plastic for the coupling collar. Injection molding may be used to form the conduit and the collar. The neoprene gasket assures water and silt free seal; neoprene possesses long-term resiliency without becoming hard or brittle. Full density linear polyethylene is transformed by a foaming agent into the so-called structural plastic which is lighter and less dense than the so-called full density polyethylene. Structural foam offers several advantages over full density injection molded plastic; flexural rigidity can be increased as much as four times over that of a solid part of equal weight. For polyethylene, it is well-known that as density increases, so does tensile strength, hardness, rigidity, and heat resistance.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. A plastic conduit section for connection to similar conduit sections, comprising: a plurality of interconnected enclosing walls defining an open ended conduit passageway with end portions having on their outside surfaces a peripheral, circumferential groove adjacent the free ends, and a circumferential flange adjacent said groove; a resilient conduit coupling collar having a plurality of parallel interconnected walls at least at one of its ends defining an open ended closure with said collar walls having inner transverse dimensions generally equal to the outer transverse dimensions of the outside surfaces of said end portions adjacent said grooves, said collar having a length sufficient to telescope upon and join together the end portions of two adjacent conduit sections; a gasket carried within each of said grooves to seal the joints between the exterior of said conduit end portions and the interior of a coupling collar telescoped over that end portion; and means, integral with and adjacent said end portions and cooperating with the interior surfaces of said coupling collar, for mechanically locking said two adjacent conduit sections and said coupling collar together by snap fitting action and said grooves being located intermediate said flange and said means.

2. A plastic conduit section as defined in claim 1, wherein said means for mechanically locking includes: conduit passageway end portions having a peripheral, outward extending, circumferential, generally continuous raised lip with the outer transverse dimensions of said lip being generally greater than the outer transverse dimensions of the outside surfaces of said end portions adjacent of said groove, and with the leading edge said lip being beveled to a smooth edge to allow inward necking of said conduit passageway end portions; and a coupling collar having at its interior an annular adapted to receive said lip, the inner transverse dimensions of the inside surfaces of said collar adjacent said annulus being generally equal to outer transverse dimensions of said lip, whereby a snap fit is obtained by interposing said collar over the end portions of said two adjacent conduit sections when said lip is received in said annulus, said collar holding together two adjacent conduit sections in a unitary structure.

3. A plastic conduit section for connection to similar conduit sections, comprising: a plurality of interconnected enclosing walls defining an open ended conduit passageway with end portions having on their outside surfaces a peripheral, circumferential groove adjacent the free ends, and a circumferential flange adjacent said groove; a resilient conduit coupling collar having a plurality of parallel interconnected walls at least at one of its ends defining an open ended closure with said collar walls having inner transverse dimensions generally equal to the outer transverse dimensions of the outside surfaces of said end portions adjacent said groove, said collar having a length sufficient to telescope upon and join together the end portions of two adjacent conduit sections; a gasket carried within each of said the grooves to seal the joints between the exterior of said conduit end portions and the interior of a coupling collar telescoped over that end portion; and means, adjacent said end portions and cooperating with the interior surfaces of said coupling collar, for mechanically locking said two adjacent conduit sections and said coupling collar together by snap fitting action, said mechanical locking means including:

conduit passageway end portions having a peripheral, outward extending, circumferential, raised lip whose outer transverse dimensions are generally greater than the outer transverse dimensions of the outside surfaces of said end portions adjacent said groove, whose leading edge is bevelled to a smooth edge to allow inward necking of said conduit passageway end portions, and whose trailing edge is at right angles to said enclosing walls; and said resilient coupling collar having an interior annulus adapted to receive said lip said annulus having inner transverse dimensions generally equal to the outer transverse dimensions of said lip and a generally rectangular cross section, whereby a snap fit is obtained by interposing said collar over the ends of said two adjacent conduit sections when said lip is received in said annulus, the annulus and lip forming interlocking complementary surfaces locking the two conduit sections to the collar.

4. A plastic conduit section as defined in claim 2, wherein said coupling collar has bevelled inside edges to cause said lip to neck inwardly and said collar ends to flare outwardly relative to each other by the camming action between the bevelled leading edge on said lip and the bevelled inside edge on said collar.

5. A plastic conduit section as defined in claim 3, wherein said annulus and said lip are interrupted at least at one location along their circumference with the interruptions in said annulus corresponding to and complementary with the interruptions on said lip portions to thereby reduce the force required to snap fit said collar on said conduit end portions.

6. A plastic conduit section as defined in claim 3, wherein said coupling collar is reinforced by an equitorial circumferential rib and by a plurality of longitudinal ribs on the outside periphery of said coupling collar, said longitudinal ribs being generally at right angles to and contiguous with said equitorial rib, the outer dimensions of said ribs being greater than the outer dimensions of said enclosing walls, whereby the end portions of said conduit passageway are forced to neck inwardly when said coupling collar is telescoped over said end portions while maintaining the thickness of said coupling collar generally equal to the thickness of said conduit enclosing walls.

7. A plastic conduit section for connection to similar conduit sections, comprising: a conduit having a plurality of interconnected enclosing walls defining an open ended, elongated, smooth surfaced enclosure with said enclosing walls having integral to them a plurality of partition walls dividing the interior of said enclosure into a plurality of elongated passageways, said enclosing walls having at their ends a circumferential, peripheral, outwardly disposed groove, said enclosing walls having a circumferential flange adjacent each of said grooves, said grooves separating said flanges from the ends of said enclosing walls; a resilient conduit coupling collar, adjacent one of the ends of said conduit enclosing walls, having a least at one of its ends a plurality of parallel interconnected enclosing walls defining an open ended enclosure with said collar walls having inner transverse dimensions generally equal to the outer transverse dimensions of the outside surfaces of said end portions adjacent said grooves and having a length sufficient to receive two adjacent conduit sections that have been telescoped into said coupling collar; gasket means, carried within each of said grooves, for sealing the joints between the exterior of said conduit and the interior of a coupling collar telescoped over that end portion; and mechanical means closer to each end of said conduit than said grooves cooperating with the interior of a coupling collar, for mechanically locking together two adjacent conduits to said coupling collar by snap fitting action.

8. A conduit section as defined in claim 6, wherein said mechanical means includes: conduit end portions having a circumferential lip interrupted at least at one location along its perimeter, said lip having a perimeter generally equal to the exterior perimeter of said conduit enclosing walls, and a coupling collar having an interior annulus dimensioned to receive said lip, whereby a snap fit is obtained by interposing said coupling collar over the ends of said two conduit sections when said lip is received in said annulus, said snap fit holding said conduit sections and said collar in a unitary structure.

9. A plastic conduit section as defined in claim 7, wherein said means for mechanically locking includes: conduit end portions with a peripheral, outward extending, circumferential lip, and with the leading edge of said lip bevelled to a smooth edge; and a coupling collar having an interior, central annulus to receive said lip, whereby a snap fit is obtained by interposing said collar over the ends of said conduit sections when said lip is received in said annulus thereby holding said conduit sections and said collar into a unitary structure.

10. A conduit section as defined in claim 9, wherein said annulus is interrupted to allow outward flaring of said collar when said lip is telescoped on said collar.

11. A plastic conduit section for connection to similar conduit sections, comprising: a conduit having a plurality of interconnected enclosing walls defining an open ended, elongated, smooth surfaced enclosure with said enclosing walls having integral to them a plurality of partition walls dividing the interior of said enclosure into a plurality of elongated passageways, said conduit having on its exterior surface a circumferential, peripheral groove adjacent each of its two ends and having on its exterior surface a circumferential flange adjacent said groove, said groove separating said flange from the adjacent end of said conduit; a resilient conduit coupling collar adjacent one of the ends of said conduit having a plurality of parallel interconnected enclosing walls at least at one of its ends defining an open ended enclosure with said collar walls having inner transverse dimensions generally equal to the outer transverse dimensions of the outside surfaces of said conduit adjacent said grooves, and having a length sufficient to receive the ends of two adjacent conduits that have been telescoped into said coupling collar; a gasket carried within at least one of said grooves to seal the joint between the outside surfaces of said conduit and said coupling collar; and mechanical means for mechanically locking together two adjacent conduits to said coupling collar by snap fitting action, said mechanical means including: conduit end portions with a peripheral, interrupted, outward extending, circumferential lip, said lip having interruptions to each side of the orthogonal centers of said conduit walls to allow necking-in of said lip, with the outer transverse dimensions of said lip being generally greater than the outer transverse dimensions of said groove but generally less than the outer transverse dimensions of said flange, the leading edge of said lip being bevelled to a smooth edge and the trailing edge of said lip being generally at right angles to the exterior surfaces of said conduit enclosing walls; and said coupling collar having an interior, central, generally rectangular, interrupted annulus to receive said lip, the interruptions in said annulus being to each side of the orthogonal centers of said collar enclosing walls and complementary to the interruptions in said lip, whereby a snap fit is obtained by interposing said collar over the ends of said two conduit sections when said lip is received in said annulus, the trailing edges of said lip cooperating with the inner edges of said annulus to hold said conduit sections and said collar in a unitary structure.

12. A plastic conduit section as defined in claim 11, wherein said coupling collar is reinforced by an equitorial rib and a plurality of longitudinal ribs on the periphery of said collar at right angles to said equitorial rib.

13. A conduit section comprising: a conduit having a plurality of interconnected enclosing walls defining an open ended, elongated, smooth surface enclosure with said enclosing walls having integral to them a plurality of partition walls dividing the interior of said enclosure into a plurality of elongated passageways, said enclosing walls having on their outside surface a circumferential, peripheral groove adjacent at least one of its ends and a circumferential flange adjacent each of said grooves; a resilient conduit coupling collar adjacent said one end and having a plurality of parallel interconnected enclosing walls at least at one of its ends defining an open ended enclosure with said collar enclosing walls having an inner transverse dimension generally equal to the outer transverse dimension of the outside surfaces of said conduit adjacent said groove, said collar having a length sufficient to receive two similar adjacent conduit sections that have been telescoped into the ends of said coupling collar; a gasket carried within that groove adjacent said one end to seal the joint between said conduit and said coupling collar; and mechanical means, at the ends of the flanged enclosing walls and at the interior of said coupling collar, for mechanically locking said conduit to said coupling collar into a unitary structure by snap fitting action, said mechanical means including:

conduit end portions having at said one end a peripheral, outward extending, circumferential lip whose leading edge is bevelled to a smooth edge and whose trailing edge is at right angles to the exterior surfaces of said conduit walls; and said coupling collar having an interior, central annulus to receive said lip, the annulus of said collar being generally rectangular in cross-section, whereby the trailing edge of said lip and the interior side walls of said annulus interlock together when said lip snaps back into its original shape, said lip having been forced to neck inwardly when passing into said coupling collar.

14. A resilient plastic coupling collar for joining together two adjacent similar conduits, said conduits having lipped end portions at the terminal ends of said conduits and a sealing gasket positioned adjacent said lipped ends, comprising: a plurality of parallel interconnected walls at least at one of its ends defining an open ended enclosure to telescope upon two adjacent conduits, the inside surface of said collar walls mating with the outside of a sealing gasket carried on said conduit sections; said interconnected walls defining an interior circumferential cavity to receive the lipped ends of said conduits, whereby a snap fit is obtained by interposing said collar over the ends of said conduits, the outer transverse dimensions of said lipped ends being generally greater than the inner transverse dimensions of the ends of said collar and generally less than the outer transverse dimensions of said cavity, said lipped ends and said cavity cooperating to hold together said two conduits and collar in a unitary structure, the inside edges of said interconnected walls being bevelled to a smooth surface thus forming a camming surface to neck inwardly the lipped edges of said conduits and to flare outwardly the ends of said collar when said collar is telescoped upon said conduit ends.

15. A coupling collar as defined in claim 14, wherein said interior cavity is an interrupted annulus.

16. A plastic conduit section for connection to similar conduit sections, comprising: a conduit having a plurality of interconnected enclosing walls defining an open ended passageway; a plastic conduit coupling collar, adjacent one of the free ends of said conduit section, having at least on its ends a plurality of interconnected parallel walls defining an open ended enclosure, the walls of said collar having inner transverse dimensions generally equal to the outer transverse dimensions of said conduit sections so as to telescope upon and join together two adjacent similar conduit sections; sealing means, on the ends of said conduit section, for sealing the joint between said conduit section and said coupling collar; and circumferential means, adjacent the ends of said conduit sections and at the interior of said collar, for mechanically locking together said two adjacent similar conduit sections to said coupling collar by snap fitting action, said conduit sections having a circumferential flange adjacent said sealing means, said sealing means being located intermediate said flange and said circumferential means said flange acting as a stop to limit the travel of said collar along the free ends of said conduit, whereby said two adjacent conduit sections are coupled together by driving the ends of said conduit sections into the interior of said collar, said collar being correctly positioned to accept each of said conduit sections by virtue of said flange.

17. A plastic conduit section for connection to similar conduit sections by a coupling collar which overlaps the ends of each conduit section, comprising: a plurality of interconnected enclosing walls defining an open-ended passageway with end portions having a peripheral flange; said end portions adapted to receive said coupling collar for joining together the end portions of two adjacent similar conduit sections; a sealing surface on the exterior surface of said end portions to seal the joint between one of said conduit end portions and said coupling collar; stop means adjacent said flange for limiting the travel of the coupling collar along said end portions, said sealing surface lying between said flange and said stop means; and means on said collar and flange for mechanically locking the end portions of said enclosing walls to said collar by snap-fitting action, whereby said coupling collar is correctly positioned along the end portions of said enclosing walls by driving said coupling collar on said end portions until said stop means is engaged, said mechanical means holding said coupling collar intermediate the end portions of said two conduit sections in sealing engagement with said two conduit sections.

* * * * *